(12) United States Patent
Chen et al.

(10) Patent No.: US 9,641,683 B2
(45) Date of Patent: *May 2, 2017

(54) METHOD AND APPARATUS FOR NETWORK-INTELLIGENCE-DETERMINED IDENTITY OR PERSONA

(71) Applicant: AT&T Intellectual Property II, L.P., Atlanta, GA (US)

(72) Inventors: Yihsiu Chen, Seattle, WA (US); Mark Jeffrey Foladare, East Brunswick, NJ (US); Shelley B. Goldman, East Brunswick, NJ (US); Thaddeus Julius Kowalski, Summit, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,015

(22) Filed: Jan. 4, 2016

(65) Prior Publication Data

US 2016/0119479 A1    Apr. 28, 2016

Related U.S. Application Data

(63) Continuation of application No. 14/539,253, filed on Nov. 12, 2014, now Pat. No. 9,277,048, which is a continuation of application No. 14/161,768, filed on Jan. 23, 2014, now Pat. No. 8,913,735, which is a continuation of application No. 10/629,730, filed on
(Continued)

(51) Int. Cl.
*H04M 3/00* (2006.01)
*H04M 5/00* (2006.01)
*H04M 3/51* (2006.01)
*H04M 3/42* (2006.01)
(Continued)

(52) U.S. Cl.
CPC ........ *H04M 3/5191* (2013.01); *G06F 3/0482* (2013.01); *G06F 3/04842* (2013.01); *H04M 3/00* (2013.01); *H04M 3/42042* (2013.01); *H04M 3/42365* (2013.01); *H04M 3/51* (2013.01); *H04M 5/00* (2013.01);
(Continued)

(58) Field of Classification Search
CPC ................... H04M 3/523; H04M 3/51; H04M 2203/2011; H04M 1/57; H04M 3/42042; H04M 1/576; H04M 3/54
See application file for complete search history.

(56) References Cited

U.S. PATENT DOCUMENTS 5,946,386 A    8/1999    Rogers et al.
5,983,170 A    11/1999    Goodman
(Continued)

*Primary Examiner* — Oleg Asanbayev

(57) ABSTRACT

A method and apparatus is presented for enabling an agent to assume the identity or persona of a called party and process calls directed to the called party. In one embodiment, methods, which enable an agent to assume the identity or persona of a called party, and process calls directed to the called party are considered a call center functions and may be implemented in a call center. A call is initiated to a called party. Initiating the call generates called party information. Using the called party information a server retrieves information associated with the called party and then forward the information associated with the called party to an agent. The call is then forwarded to the agent. As a result, the agent may use the information associated with the called party to assume the identity or persona of the called party when responding to the call.

17 Claims, 9 Drawing Sheets

Related U.S. Application Data

Jul. 29, 2003, now Pat. No. 8,675,858, which is a continuation-in-part of application No. 10/368,027, filed on Feb. 14, 2003, now abandoned.

(51) Int. Cl.
*G06F 3/0482* (2013.01)
*G06F 3/0484* (2013.01)

(52) U.S. Cl.
CPC ............... *H04M 2203/407* (2013.01); *H04M 2203/6045* (2013.01)

(56) References Cited

U.S. PATENT DOCUMENTS

| | | |
|---|---|---|
| 6,134,318 A | 10/2000 | O'Neil |
| 6,317,701 B1 | 11/2001 | Pyotsia et al. |
| 6,442,247 B1 | 8/2002 | Garcia |
| 6,463,145 B1 | 10/2002 | O'Neal et al. |
| 6,584,490 B1 | 6/2003 | Schuster et al. |
| 6,647,107 B1 | 11/2003 | Horrer |
| 6,959,080 B2 | 10/2005 | Dezonno et al. |
| 7,006,607 B2 | 2/2006 | Garcia |
| 2003/0033179 A1 | 2/2003 | Katz et al. |
| 2003/0119492 A1 | 6/2003 | Timmins et al. |

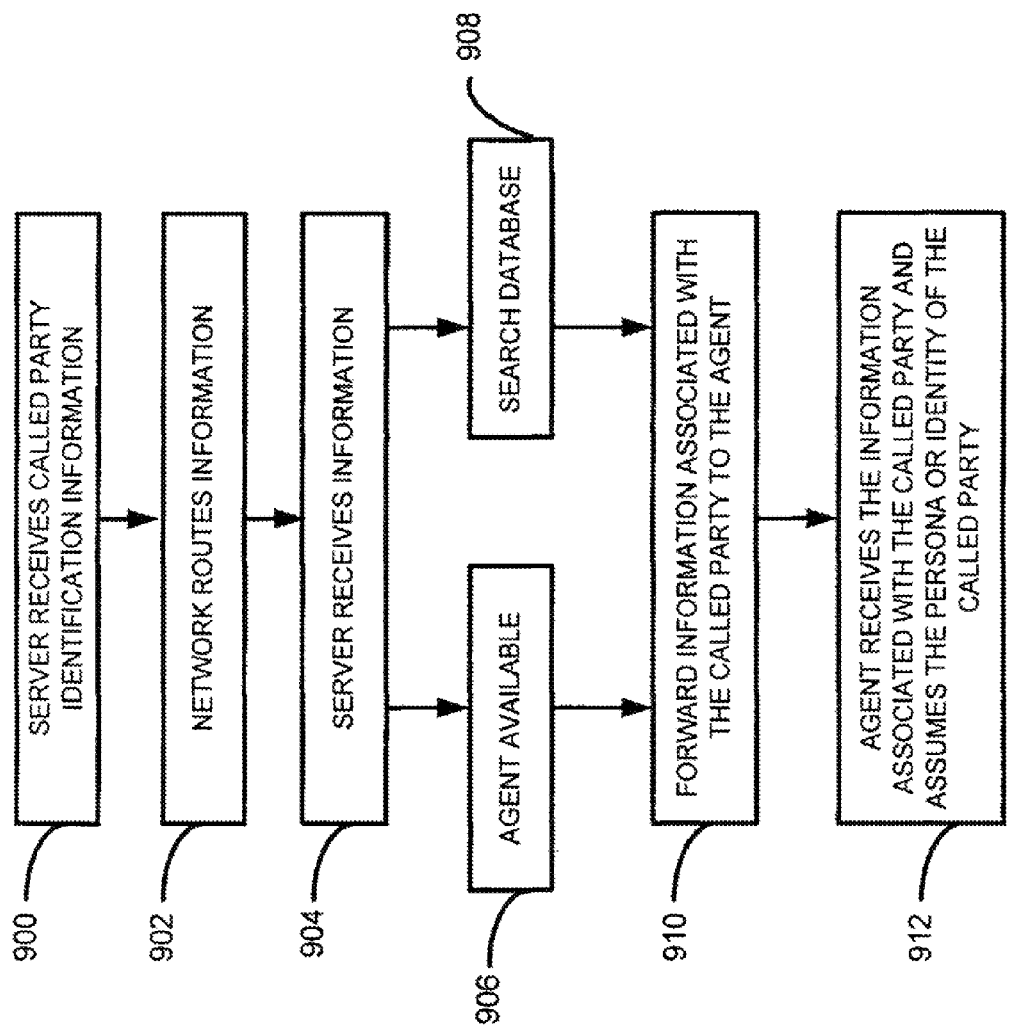

METHOD AND APPARATUS FOR NETWORK-INTELLIGENCE-DETERMINED IDENTITY OR PERSONA

CROSS REFERENCE TO RELATED APPLICATIONS

This application is a continuation of application Ser. No. 14/539,253 entitled "Method and Apparatus for Network-Intelligence-Determined Identity or Persona," filed on Nov. 12, 2014, the contents of which are incorporated herein by reference, which is a continuation of application Ser. No. 14/161,768 entitled "Method and Apparatus for Network-Intelligence-Determined Identity or Persona," filed on Jan. 23, 2014, which issued as U.S. Pat. No. 8,913,735 on Dec. 16, 2014, the contents of which are incorporated herein by reference, which is a continuation of application Ser. No. 10/629,730, entitled "Method and Apparatus for Network-Intelligence-Determined Identity or Persona," filed on Jul. 29, 2003, which issued as U.S. Pat. No. 8,675,858 on Mar. 18, 2014, the contents of which are incorporated herein by reference, which is a continuation-in-part of application Ser. No. 10/368,027 entitled "Method and Apparatus for Preset Message Response to Call Notification," filed on Feb. 14, 2003, now abandoned, the contents of which are incorporated herein by reference.

TECHNICAL FIELD

This invention relates to communication networks. Specifically, the present invention relates to message notification technology.

BACKGROUND

A conventional call center typically consists of a grouping of individuals (i.e., call center agents) that are designated to manage calls. Call centers are used by mail-order catalog organizations, telemarketing companies, computer product help desks, large organization that use the telephone to sell or service products and services, etc. Company call center agents may be part of an in-house team of individuals or call center agents may work as part of an outsourced call center function. Modern call centers often use computer automation. The computer automation enables the call center agents to handle a large volume of calls at the same time, to screen calls, to forward calls, and to log calls.

FIG. 1 displays a conventional call center. An end-user 100 places a call using a traditional telephone to a company. The call is switched across a network 102 such as circuit-switched network to the company. Call information 102 such as trunk information is communicated to a Private Branch Exchange (PBX) 106. The call information 108 is then communicated to a computer telephony (CTI) system 110. Based on the call information 108, the CTI 110 forwards information to a company agent 112 who is designated to receive calls for the company.

However, a number of issues arise in using a conventional call center network. First, network 102 is typically implemented with traditional telephony technology such as circuit-switched technology. With the advancement of modern communications networks a large variety of additional network technologies need to be addressed and taken into consideration to perform call center operations. The call center depicted in FIG. 1 is typically deployed by a large product or service company. Smaller organizations require the ability to implement call center functions using existing hardware and the most modern technologies. Lastly, one company agent 112 typically has to be available for each call coming into a call center and it is difficult to optimize calls across company agents 112 unless specialized hardware is purchased.

Many companies have decided to outsource their call center functions. As a result, an industry of call center companies has emerged. These companies employ a number of agents to receive calls on behalf of a company and responds to end-user inquiries about the company, company products, company services, etc. Typically agents are assigned based on the called party. For example, an agent responding on behalf of a specific department store will learn the department store products, services, etc., so that the agent can respond on behalf of the department store. However, in order to efficiently deploy each agent, it would be beneficial to enable each agent to respond to any call that the agent receives and assume the identity of the called party for a wide variety of called parties.

Thus, there is a need for a method and apparatus that enables an agent to assume the identity of a wide variety of called parties. There is a need for a method and apparatus for implementing a call center function in smaller organizations. There is a need for a method and apparatus for implementing a call center function without the purchase of specialized hardware. There is a need for a method and apparatus for implementing a call center function using the latest communication technology. There is a need for a method and apparatus for implementing a call center function that utilizes standard computing hardware but still has the flexibility to optimize calls across available agents.

SUMMARY

A method and apparatus is presented which enables an agent to receive information related to a called party prior to receiving a call directed to the called party. As such, the agent may assume the identity or persona of a wide range of called parties and process the call on behalf of a wide range of called parties.

Called party identification information is received in a server. The called party identification information is used to identify an available agent to answer the call and to search a database for information associated with the called party. The information associated with the called party is forwarded to an identified agent. The call is also forwarded to the identified agent. As a result, when the identified agent receives the call the identified agent may assume the identity and/or persona of the called party.

In one embodiment, methods are implemented in a server (i.e., server methods), which automatically performs configured responses when call information such as called party identification information is received. The called party identification information is generated when a call is initiated for a called party. The call is directed to an agent. The agent then assumes the identity and persona of the called party. As such, the agent performs call center functions. It should be appreciated that, the call center may be a local, a distributed, an in-house or an outsourced call center.

While a variety of techniques are used to implement the method and apparatus of the present invention, several methods, are highlighted for the purposes of discussion. In a first method, a server responds to the calling party with a previously configured response, such as a pre-canned message, when called party identification information is received from the calling party. In a second method, when called party identification information is received from the calling party, a server responds to the calling party and the server notifies an agent of the incoming call. In a third method, when called party identification information is received from a calling party, a server responds to the calling party by performing a first previously configured response, the server transmits a notification message to an agent, the server receives a response from the agent, and then the server responds to the calling party by performing a second configured response. In a fourth method, a server receives called party identification information and searches for information related to a called party based on the called party identification information and using business logic implemented in the server. The server forwards the information associated with the called party to a client machine operated by an agent. The server then directs the call to the agent. Directing the call to the agent may include switching the call to a client machine operated by the agent or causing another device to switch the call to the client machine. Once the agent has received both the information associated with the call and the call itself, the agent may assume the identity and/or persona of the called party using the information associated with the called party to respond to the call.

In another embodiment of the present invention, an agent receives a message (i.e., notification) from a server. The notification includes information associated with a called party and indicates that a calling party is attempting to make contact with the called party. The message causes a GUI to launch on a communication instrument used by the agent. In one embodiment, the GUI includes the information associated with the called party or the GUI enables the agent to access the information associated with the called party. The GUI may provide the agent with various options for selection, which once selected, will be transmitted to the server and may cause the server to perform a configured response. In an alternative, the GUI may provide the agent with various options for selection, which once selected, may enable the agent to operate the GUI and assume the identity and/or persona of the called party.

A method comprises the steps of receiving call information identifying a called party; forwarding call information associated with the called party to an agent in response to receiving the call information identifying the called party; and causing a call to switch to the agent in response to forwarding the call information associated with the called party to the agent.

A method of operating a communications device comprises the steps of receiving information associated with a called party; receiving a call directed to the called party after receiving the information associated with a called party; and operating a called device to assume the persona of the called party in response to receiving the information associated with the called party and in response to receiving the call.

A method comprises the steps of receiving call information for a called party; performing a first configured response in response to receiving the call information; transmitting information associated with the called party to an agent in response to receiving the call information; and receiving a response from the agent in response to transmitting the information associated with the called party.

BRIEF DESCRIPTION OF THE DRAWINGS

FIG. 9 displays a flow diagram depicting a call center application of the present invention.

DETAILED DESCRIPTION

Figure 1:
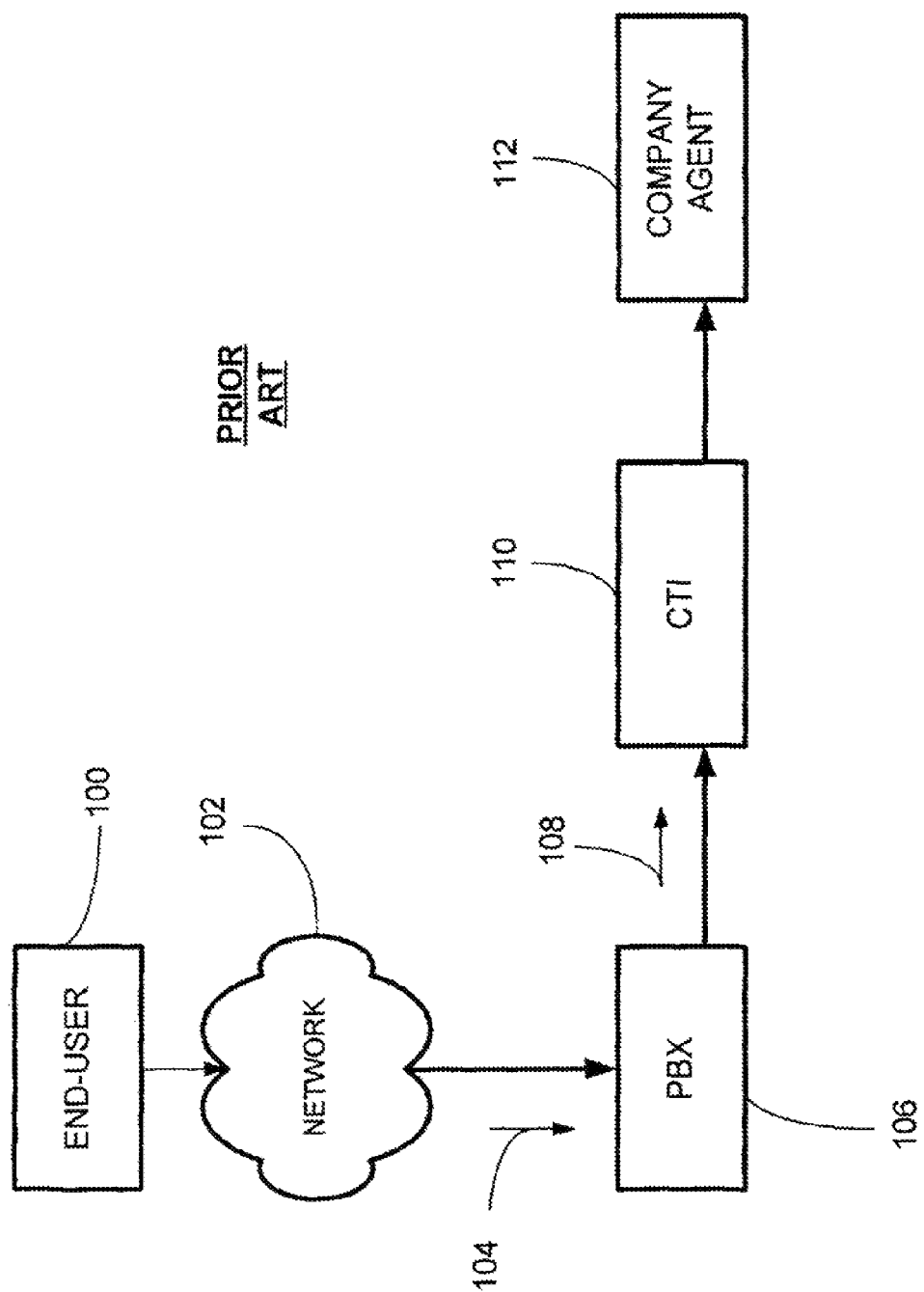
FIG. 1 displays a prior art call center network.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

In one embodiment of the present invention, a method and apparatus for implementing a call center function presented. In one embodiment an agent responds to a calling party with configured responses. The configured responses may be implemented in a server and automatically operate when the server receives call information, such as called party identification information from a calling party. In an alternative embodiment, a configured response may include a notification to an agent who operates on behalf of the called party. The agent is then presented with a GUI, which can be used by the agent to provision the server and initiate a second configured response. Lastly, any combination of the foregoing methods may be implemented to provide for both an automated configured response and/or the initiation of a configured response, which is based on agent input. As such, an agent may provide a meaningful response to a calling party before the agent receives information associated with the called party or an agent may assume the identity and persona of the called party by responding to a call after receiving information associated with the called party.

In one embodiment of the present invention, an agent such as a call center agent receives information associated with a called party prior to receiving a call designated for the called party. As such, the agent is able to assume the persona or identity of the called party using the information associated with the called party and responds to questions or performs processing on behalf of the called party. It should be appreciated that assuming the persona or identity of the called party includes an agent representing themselves as the called party to a calling party. In another embodiment, assuming the persona or identity of the called party includes an agent functioning as the called party.

In one embodiment of the present invention, a method and apparatus for implementing call response capability such as a call center function is presented. An end-user may dial a toll free number such as an 800 number to reach a call center and the call is routed to a call center agent using modern communication technology. For example, the call may be routed using Internet Protocol (IP) technology, instant messaging technology, wireless technology, etc. In addition, data packet technology such as e-mail and Voice-over-IP technology may be implemented using instruments such as Personal Data Assistants (PDA), laptop computer, etc.

In one embodiment, an end user attempts to make a call to a service organization, a product company or any called party. A server connected to the Internet receives the call including called party identification information. In one embodiment, the called party identification information includes the called number. A server searches a database using the called party identification information as a search key. In addition, specific business logic is performed based on the called party identification information or based on routines stored in the database. As a result, information associated with the called party is retrieved from the database. The information associated with the called party is forwarded from the server to an agent. After the agent receives the information associated with the called party the agent receives the call. For example, if the end users are calling a toll free number for a department store (i.e., called party), the catalogue associated with the department store (i.e., information associated with the called party) may be stored in the database. Based on the called party identification information the server may search the database for the information associated with the called party and then forward the catalogue to the agent along with identifying information such as the name of the department store, name of the caller, specific scripts that the agent should use, etc. The call may then be switched to the agent for processing and the agent can respond to questions from the end user. Based on the identifying information and the catalogue, the agent is then able to respond to the call from the end user and present himself/herself as a representative of the department store. In addition, since a catalogue is available to the agent the agent is also able to process the call by answering questions on items in the catalogue. It should be appreciated that in one embodiment of the present invention, the agent may receive calls directed to many different called numbers. Based on the different called numbers (i.e., different called party identification information), a different departments store, catalogue, script, etc. may be provided to the agent. As a result, after receiving the call the agent is able to present himself/herself as a representative of the called party and assume the persona or identity of the called party.

Figure 2:
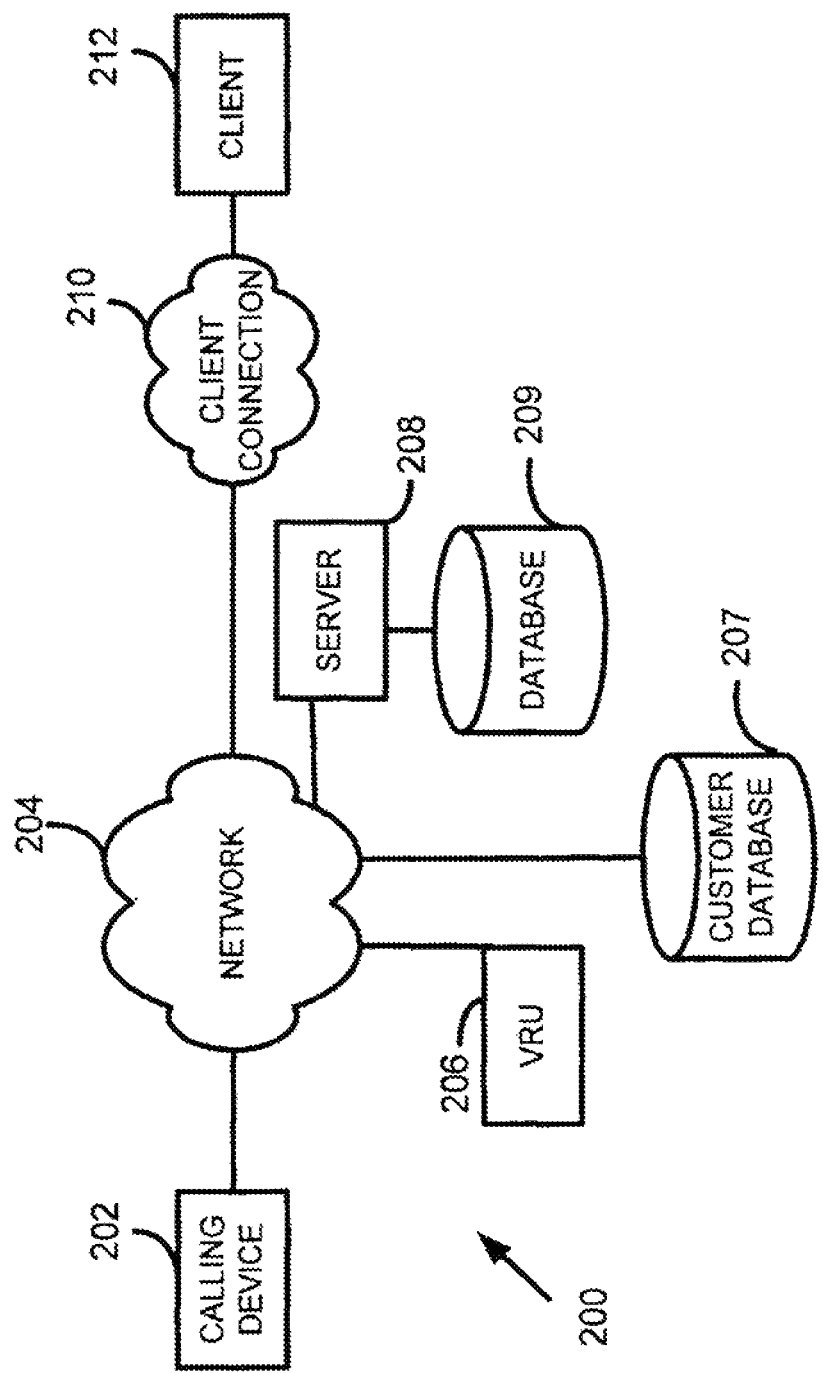
FIG. 2 displays a network diagram implemented in accordance with the teachings of the present invention.

FIG. 2 displays a network architecture 200 implemented in accordance with the teachings of the present invention. In one embodiment of the present invention, a calling party initiates a call with a calling device 202. For example, the calling party may be an end-user dialing a toll free number to reach a department store or some other service. The calling device 202 may be implemented with any type of communication instrument, such as a standard voice telephone, an IP telephone, a PDA, a computer, wireless telephone, etc.

The calling device 202 is used by a calling party to initiate contact with a called party. As such, call information is generated by the calling device 202. The call information may include any information associated with a call. For example, the call information may include any information generated by the calling device 202 from the initial signaling information or handshaking used to initiate a call and locate the called party (i.e., agent) to the substantive communication information between the calling party and the called party (i.e., agent), as well as any terminating signaling or handshaking used to terminate communication. Further, the call information may include passive call information, such as caller identification information, call duration information, or time of call information. The call information may include active call control information, such as call transfer information, conference calling information, etc. The call information may include call presentation information where the calling party and the called party are exchanging information that does not affect the call flow, but is information that defines the calling party or the called party operations.

In addition, since the calling device 202 may be implemented with a variety of media, the call information may include analog voice information, digital information, text, graphic, still images, video, etc. Lastly, it should be appreciated that call information may include any information, message, or signaling required to support call processing (i.e., such as call notification processing), etc. whether generated or stored in the calling device 202 or generated or stored by another device implemented in accordance with the teachings of the present invention.

In one embodiment of the present invention, call information includes called party identification information. Called party identification information may include any information that identifies the called party. For example, called party identification information may include a called party number, a called party e-mail address, called party chat identification, etc.

The calling device 202 is connected to a network 204. The network 204 may be a circuit-switched network, a packet-switched network, an Asynchronous Transfer Mode (ATM) network, an optical network, a wireless network, or any other type of network suitable for communicating information. In one embodiment, using the called party identification information, network devices within the network 204 switch the call to a server 208 and/or to the agent on a client device operated by the agent.

A voice recognition unit (VRU) 206 is connected to the network 204. The VRU 206 may perform text-to-speech conversion as well as speech-to-text conversion. When conversion of text-to-speech or speech-to-text is required, the VRU 206 receives the text or speech from the network 204, performs the conversion, and then transmits the text or speech across the network 204. As such, when conversion is required, the VRU 206 may transmit information in both, the forward direction and reverse direction. It should be appreciated that both the text-to-speech and speech-to-text information may be considered call information.

The server 208 performs a variety of functions. The server 208 (a) may determine if an agent is available on a client, such as client 212, (b) the server 208 may generate commands that result in the call being switched to the client 212, (c) the server 208 may perform business logic, (d) the server 208 may search various databases to retrieve information associated with the called party and (e) the server 212 may forward information associated with the called party to an agent operating a client machine 212.

In one embodiment, the server 208 may search customer database 207 and retrieve presence information, which will identify which agent, is on duty and which devise should be used to contact the agent. In one embodiment, the presence information may include information relating time of day, client identification information and agent identification information. As such, the server 208 may search the database 209 and determine, which agent may be contacted, on what devise, at what time. Further, server 208 may make and initial call to contact or notify the agent of an incoming call and to make sure that the agent is available to receive the call. Should an agent be unavailable to receive a call, in an alternate embodiment of the present invention, the server

208 may search the database 209 to identify an alternate client 212 and agent associated with a specific time.

The server 208 may generate commands that result in the call being switched to the client 212. In one embodiment, the server 208 may communicate with a communication device in the network 204 to switch the call to the appropriate client 212 after the client 212 has been identified by searching the database 209. In another embodiment, the server 208 may generate commands that switch the call to a client 212 after information associated with the called party is forwarded to the client 212. Lastly, depending on the implementation of the server 208, the server 208 may include the capability to switch the call itself to a client 212. For example, if the server 208 is implemented with an automatic call distribution (ACO) device, the server 208 may be capable of forwarding information resulting from a search of databases such as customer database 207 and/or database 209; and switching the call to the client 212.

The server 208 may implement business logic. It should be appreciated that the server 208 may operate under a wide variety of business logic that is within the scope of the present invention. For example, based on the called party identification information the server 208 may implement business logic that switches the call to a premium call center for premium customers. The premium call center may have a shorter queue and better trained agents to assist premium customers. In addition, the business logic may retrieve specialty catalogues from the customer database 207 and more detailed customer information from the called party database.

The server 208 may search customer database 207 and/or database 209 to retrieve information. The server 208 may then use the information (i.e., scripts and algorithms) to implement business logic, may forward the information to the client 212 or may use the information to switch or forward calls.

In another embodiment, the server 208 may relay call information (i.e., contact messages or calls), which initiate from the calling device 202 and travel across the network 204. In addition, the server 208 may generate response messages, notification messages, etc. in response to receiving call information. The notification messages and response messages generated by the server 208 may also be considered call information. Lastly, when conversion is required (i.e., text-to-speech or speech-to-text), the server 208 may receive call information from the VRU 206.

In one embodiment of the present invention, the server 208 is in communication with customer database 207 and a database 209. The database 209 may be directly connected to the server 208 as shown in FIG. 2 or the server 208 may communicate with the database 209 across a network. The customer database 207 may directly connect with the server 208 or the database 209 may communicate across the network and communicate with the server 208.

In one embodiment, the customer database 207 may be implemented as a called party database. As such the customer database 207 may store information associated with a called party, such as customer relationship management information. The customer relationship management information may include any information that would help an agent assume the persona and/or identity of the called party and provide knowledge about the customers of the called party. This may include specific business rules related to customers, the called parties business, scripts about the called parties business, data about the called parties business, etc. For example, customer relationship management information may include the preferences of a customer, such as the customers, product preferences, price preferences, responding agent preferences, etc.

In one embodiment of the present invention, the customer database 207 may be resident at the called party's business site and maintained and updated by the called party. In another embodiment, customer database 207 may be located at the call center site and be maintained by the call center business.

The database 209 stores a variety of information such as business logic and routines that may be run on the server 208; information associated with the called party; and configured response information. The server may perform unique business logic based on the called party identification information. The unique business logic may be implemented by operating scripts, algorithms, etc. on the server 208. In one embodiment of the present invention, the scripts, algorithms, etc. are stored and operated in the server 208. In another embodiment of the present invention, the scripts business logic, etc. are stored in the database 209 and operate on the server 208. For example, the called party identification information may be used as a key to search the database 209 and retrieve scripts, algorithms, etc. associated with the called party. The server 208 may then implement the business logic of the called party by operating based on the scripts, algorithms, etc. retrieved from the database 209.

Customer database 207 and/or database 209 may also store information associated with the called party. For example, specific product information, or verbal scripts that an agent should recite may be stored in customer database 207 and/or database 209. For example, product images, text, etc. may be stored in the customer databases 207 and/or database 209. In one embodiment, customer database 207 and database 209 may be implemented in the same database. In another embodiment, customer database 207 and database 209 may be implemented in a different database, which is located in the same site or may be located at a different site. For example, each customer database 207 may be located at a customer site and accessed through the network 204.

In one embodiment, the database 209 stores configured response information (i.e., configured responses). The configured responses may include software to operate the server 208 and perform a configured response or may include data (i.e., pre-canned message) to perform a configured response. Pre-canned messages include previously recorded messages that may be selected and used in the method and apparatus of the present invention. The server 208 accesses the database 209 for data required to perform a configured response.

The server 208 communicates with a client 212 across a client connection 210. The client connection 210 may be implemented as a direct connection between the server 208 and the client 212. In the alternative, the client connection 210 may be implemented with communication technology, which facilitates communication between the server 208 and the client 212. For example, the client connection 210 may be implemented as a Local Area Network (LAN), a Wide Area Network (WAN), a circuit switched network, a packet-switched network, a wireless network, etc.

An agent (i.e., who assumes the identity/persona of a called party) interfaces with the network architecture 200 through the client 212. The client 212 may be implemented using a variety of different media. For example, the client 212 may be implemented with a traditional voice telephone, an IP telephone, a computer, a PDA, a wireless telephone, etc. In addition, the client 212 may receive and transmit different types of messages, such as analog voice messages, digital voice messages, text messages, video, etc. Lastly, the client 212 may be implemented with hardware, software, or a combination of hardware and software.

In one embodiment of the present invention, a calling party uses the calling device 202, such as a traditional telephone, e-mail, etc. to initiate call information, such as called party identification information, etc. The call information is communicated across the network 204 to the server 208. In the case where text-to-speech or speech-to-text conversion is required, the call information is routed from the calling device 202 across the network 204 to the VRU 206. The VRU 206 may perform the conversion and forwards converted call information across the network 204 to the server 208. The server 208 may then forward call information (i.e., a notification message) across the client connection 210 to the client 212; perform business logic based on the call information; and/or access a database using the call information and forward information associated with the called party to an agent operating the client 212. An agent may then receive information associated with the called party and/or the call information on the client 212 and may respond. The response is communicated across the client connection 210 to the server 208. The response may then be communicated back across the network 204 to the calling device 202 and received by the calling party. Once again, if necessary, text-to-speech and/or speech-to-text conversion may be performed.

In accordance with the teachings of the present invention, methods may be implemented to enable a calling party to receive a response before the agent is contacted or notified of a call. A variety of these methods may be implemented and still remain within the scope and teachings of the present invention. However, for the purposes of illustration, three methods will be the focus of our discussion. While the foregoing methods may be implemented in various components of the network architecture 200, in one embodiment of the present invention, the foregoing methods may be implemented in the server 208 of FIG. 2.

In the first of the three methods, when call information is received from the calling party, a configured response, such as an automated response to the calling party, is performed. In a second method, when call information is received from the calling party, a configured response, such as directing the calling party to voicemail is performed and a notification message is transmitted to the agent. In a third method, when call information is received from the calling party, a first configured response, such as a pre-canned message, is transmitted back to the calling party, notification is transmitted to the agent, and a second configured response is performed when a response (i.e., agent input) to the notification is received.

Figure 3:
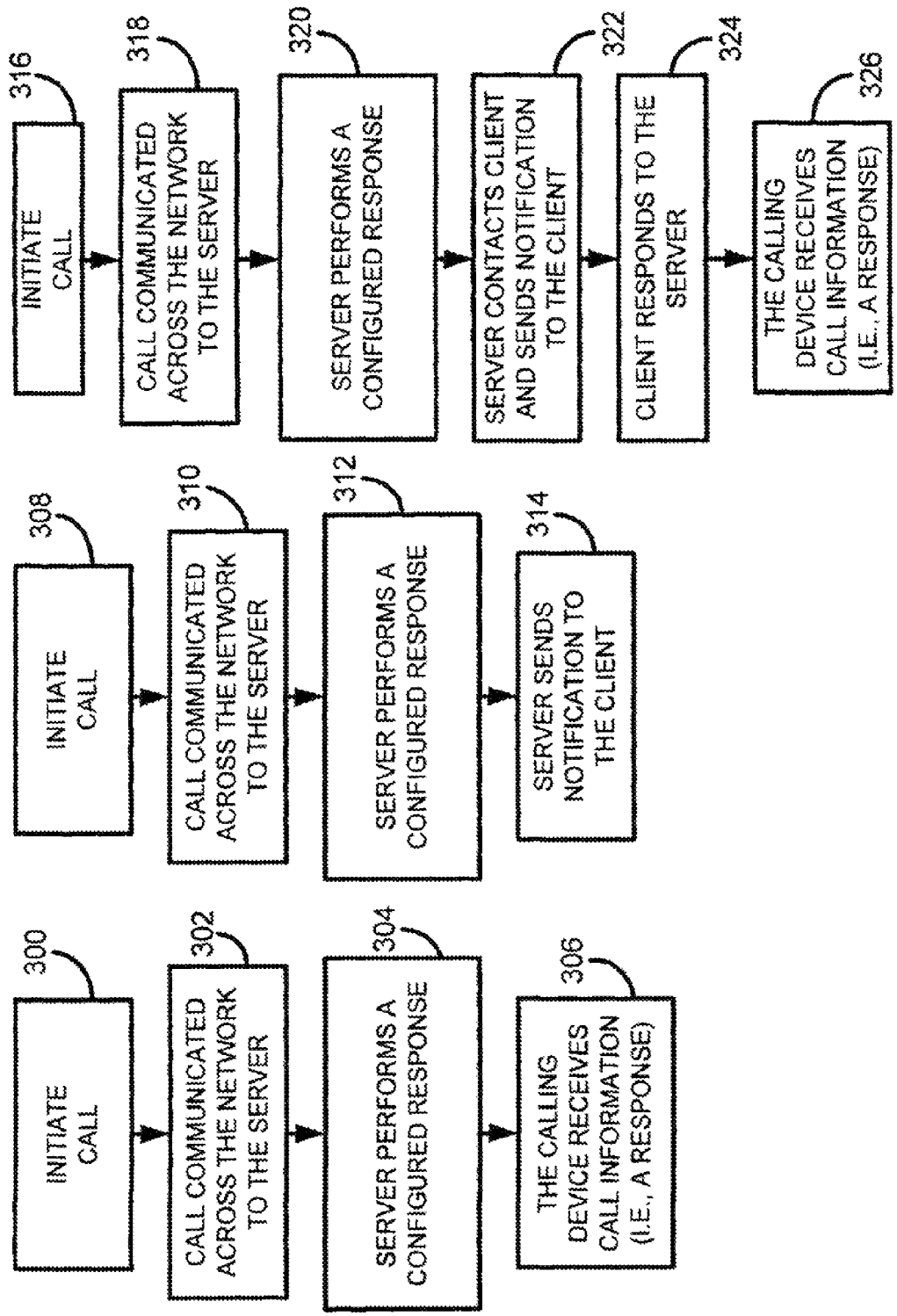
FIG. 3A displays a first network method implemented in accordance with the teachings of the present invention.
FIG. 3B displays a second network method implemented in accordance with the teachings of the present invention.
FIG. 3C displays a third network method implemented in accordance with the teachings of the present invention.

FIGS. 3A, 3B, and 3C display network implementations of the foregoing methods. FIGS. 3A, 3B, and 3C will be discussed in conjunction with FIG. 2. In FIG. 3A, call information is initiated at 300. The call information may be initiated with calling device 202. As shown at 302, the call information is communicated across the network 204 to the server 208. The call information may be communicated through VRU 206 if text-to-speech or speech-to-text conversion is required. At 304, the server performs a configured response, such as sending the calling party to voice mail or transmitting a pre-canned message, which informs the calling party of the location of the called party. At 306, the calling device receives call information, which is a response from the server.

FIG. 3B displays an implementation of a second method. In FIG. 3B, the calling device 202 initiates a call and generates call information as shown at 308. The call information is communicated across the network 204 to the server 208. The call information may be communicated through VRU 206 if text-to-speech or speech-to-text conversion is required. At 310, the server receives call information from the calling party and responds to the call information with a configured response as stated at 312. The configured response may include a variety of actions, such as directing the calling party to a voicemail or communicating a pre-canned message to the calling party. For example, the pre-canned message may include the statement, "the agent is busy," "please wait while we locate the agent," etc. In the case where a pre-canned message is automatically communicated to the calling party, the calling device receives the recanned message from the server via the VRU if conversion is necessary. As such, the calling party will receive a response before the agent is located.

Further, in the second method, the server also sends notification (i.e., a message) to the client 212, as shown at 314, to contact the agent. This message locates the agent via the client 212 and notifies the agent that a message has been received from a calling party. For example, in one embodiment of the present invention, at step 312, the server 208 may respond to the calling party with a pre-canned message (i.e., configured response) stating that "the agent does not want to be disturbed, please try back later." In addition, the server may transmit a notification message, as shown at 314, to notify the agent of the call.

It should be appreciated that in one embodiment of the present invention, the server 208 includes presence information, which includes the contact information on various clients 212 that are used by the agent, so that the server 208 may communicate across the client connection 210 and contact the agent on the appropriate client 212. For example, the presence information may be stored in a relational database, which correlates time with a specific client 212. For example, from 7:00 a.m. to 9:00 a.m., the server may contact the agent on a cellular telephone (i.e., client 212). From 9:00 a.m. to 5:00 p.m., the appropriate client 212 may be the work computer, and from 6:00 p.m. to 5:00 a.m., the appropriate client 212 may be the home telephone. As such, using the presence information, the server 208 is able to locate the agent on the client 212 that the agent is using at the time. In an alternative embodiment, the presence information may be stored as a list of clients 212 and the server 208 may sequentially try each client 212 located in the list until the agent is located.

In a third method, shown in FIG. 3C, the calling party receives an initial configured response from the server and then receives a second configured response from the server. Using FIG. 3C, a call is initiated as shown at step 316. At step 318, call information is communicated across the network 204 to the server 208. The call information may be communicated through VRU 206 if text-to-speech or speech-to-text conversion is required. When the call information is received at the server 208, the server 108 responds to the calling device 202 with a configured response, such as communication of a pre-canned message (i.e., step 320).

In addition, the server 208 at step 322 locates and contacts the client 212. The server 208 sends a notification message to the client 212, which causes a client method to be launched on the client 212. In one embodiment of the present invention, the client method displays a listing of selectable options (i.e., pop-up list, pull-down list, etc.) for the agent to respond to the calling party. The agent selects one of the options 20 in the list, which results in a response to the server 208 as shown at 324. The client 212 responds to the server 208 with an input, which causes the server 208 to respond to the calling device 202 with a second configured response. For example, the server 208 may respond with a second pre-canned message. The calling device 202 then receives the second pre-canned message from the server 208 as shown at 326. As a result, in this third method of the present invention, a first pre-canned message (i.e., configured response) is generated to the calling party before the agent is located and then a second pre-canned message (i.e., configured response) is generated to the calling party after the agent is located and responds. As such, the response time to the calling party is reduced because in one embodiment of the present invention, the calling party may receive a quick response before the agent is contacted and then a second response quickly after the agent is contacted.

In order for the server 208 of FIG. 2 and the client 212 of FIG. 2 to function in accordance with the teachings of the present invention, the server 208 is configured to perform previously defined responses. In addition, the client 212 is configured with an option listing (i.e., pull-down list. pop-up list, speech annunciation list, etc.) to facilitate the agent response.

Figure 4:
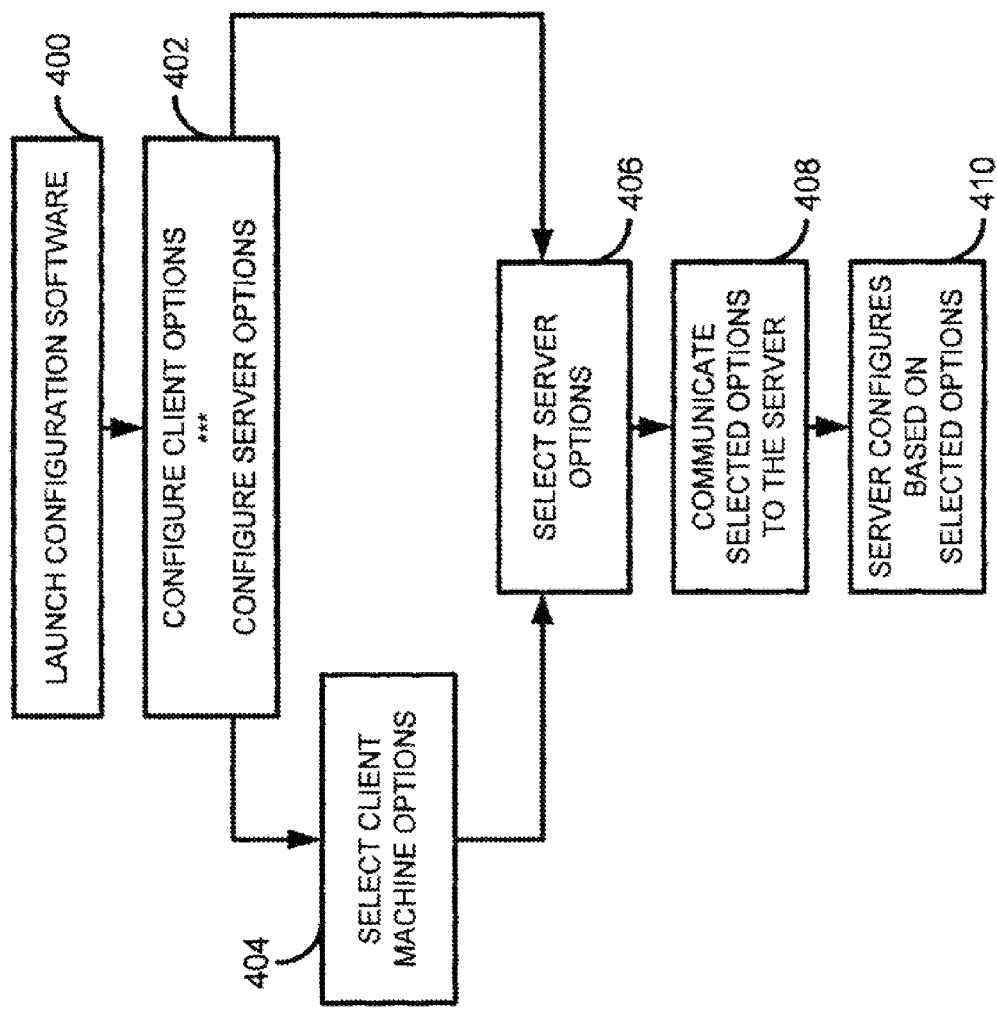
FIG. 4 displays a configuration method implemented in accordance with the teachings of the present invention.

FIG. 4 displays a method of configuring the server and the client to operate in accordance with the teachings of the present invention. The server is configured prior to receiving call information so that the server can perform operations (i.e., responses) without the input of the called party. Further, the server is configured so that with minimal input (i.e., selection of an option) from the called party, the server may perform sophisticated responses that are tailored to a specific situation. For example, the called party may select an option in the GUI that results in the transmission of an email to the calling party. As such, if the called party is aware of the calling party's questions, the email may provide the answer to the questions.

At 400, configuration software is launched. In one embodiment of the present invention, the configuration software configures both the client options and the server options. The configuration software may reside in the server, the client, or in another device connected to the network. At 402, an option is presented to configure the client or configure the server. In one embodiment of the present invention, configuring the client enables the called party to design the GUI and choose the options that will populate the GUI. In another embodiment of the present invention, configuring the server will enable the called party to design the various responses (i.e., configured responses) that the server will perform when call information is received and when the called party selects an option from the GUI.

When configuring the client, the called party may select a pop-up list as the GUI. In addition, several options may be designed to populate the GUI. For example, options, such as "respond with voice mail," "respond with pre-canned message," and then the details of the pre-canned message may each be configured and provided as selectable options in the pop-up list.

In one embodiment of the present invention, once the called party selects the client options as shown at 404, the called party may then configure the server options as shown at 406. In the alternative, the called party may move directly from 402 and configure the server at 406 by selecting the configure server option at 402.

Once the called party selects the server options at 406, the configuration method enables the called party to configure the server. The options selected by the called party are communicated to the server as stated at 408. The server then accesses a database of configuration information, such as database 109 of FIG. 1, and configures itself as stated at 410 based on the options selected by the called party and the configuration information stored in the database. The configuration information may include software routines required to operate and perform the configured responses or the configuration information may include the data required to perform the configured responses.

The server may be configured to operate in accordance with the teachings of the present invention, specifically the server may be configured to implement one of the three methods presented above. For example, the server may be configured to automatically respond to the calling party when call information is received from the calling party. The server may be configured to respond to the calling party and to communicate with the called party when call information is received. Lastly, the server may be (1) configured to respond to the calling party with a first configured response when the call information is received, (2) contact the called party, (3) receive a response from the called party, and then (4) respond to the calling party with a second configured response. Further, pre-canned messages, such as each pre-canned voice message or each pre-canned email, may be configured during the server configuration process.

In another embodiment of the present invention, the called party is able to configure the server to generate different responses based on the characteristics of the call information, such as the calling party number, etc. For example, if the calling party number is from a home number, the server may take one action, such as implementing the third of the three methods discussed above. If the calling party number is not the home number, the server may take another action, such as implementing the first of the three methods discussed above. In another embodiment of the present invention, the server may be configured to take different actions based on whether the call information is voice information or text information. It should be appreciated that a various characteristics and actions based on characteristics may be defined and still remain within the scope of the present invention.

Figure 5:
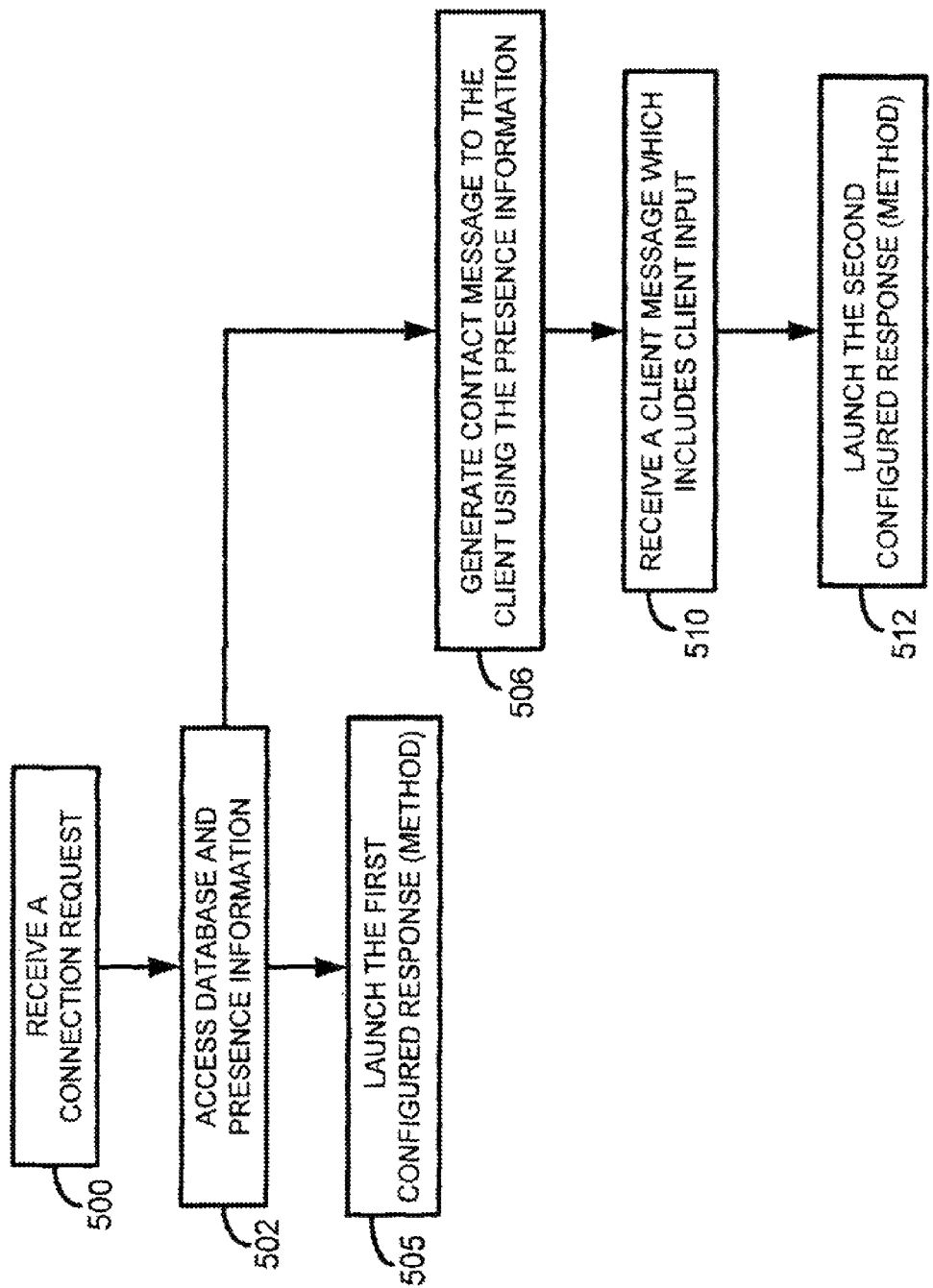
FIG. 5 displays a server method implemented in accordance with the teachings of the present invention.

FIG. 5 displays a method implemented in a server. At 500, the server receives a connection request. As stated at 502, the server accesses a database, such as the database 209 of FIG. 2. The server may also access presence information during the database access stated at 502. Software and/or data from the database access (i.e., 502) are used to launch a configured response on the server as stated at 505.

In addition, after accessing presence information as stated at 502, the server may generate a notification message to the client using the presence information as stated at 506. The server then receives a client message, which includes a client input as stated at 510, and then launches the second configured response as stated at 512.

Figure 6:
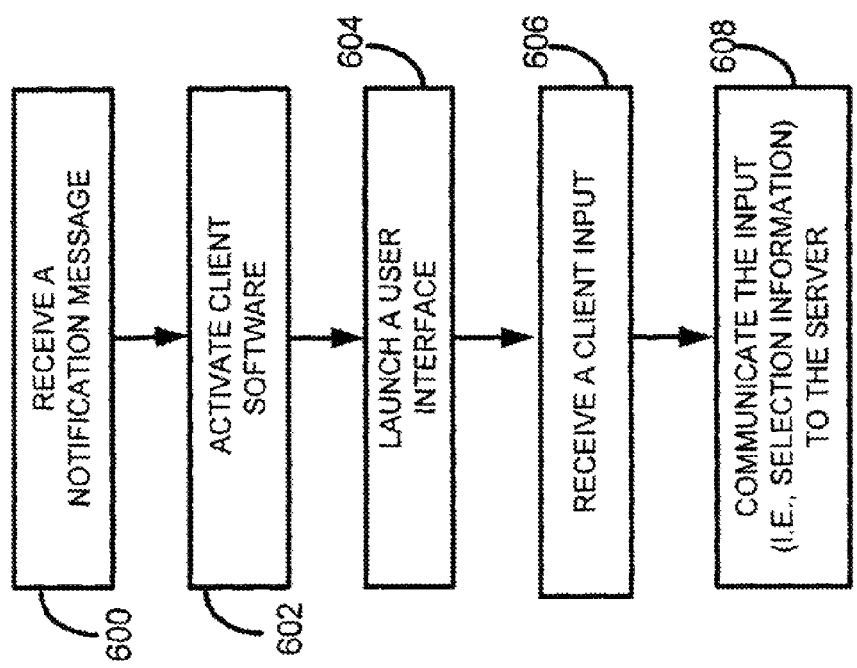
FIG. 6 displays a client method implemented in accordance with the teachings of the present invention.

FIG. 6 displays a method of operating the client 212 of FIG. 2. In FIG. 6, the client 212 receives notification information from the server 208 as shown at 600. The notification information causes the client 212 to activate client software as stated at 602. The client 212 may launch a user interface as stated at 604. In one embodiment of the present invention, the user interface may be a graphical user interface populated with various options, or in another embodiment of the present invention, the user interface may annunciate various options and request that the called party speak the input back into the client 212. The called party then provides an input by selecting an option. The input is received by the client 212 as stated at 606. Once the input is received from the called party, the client 212 may transmit the option selected (i.e., selection information) by the called party to the server as shown at 608.

Figure 7:
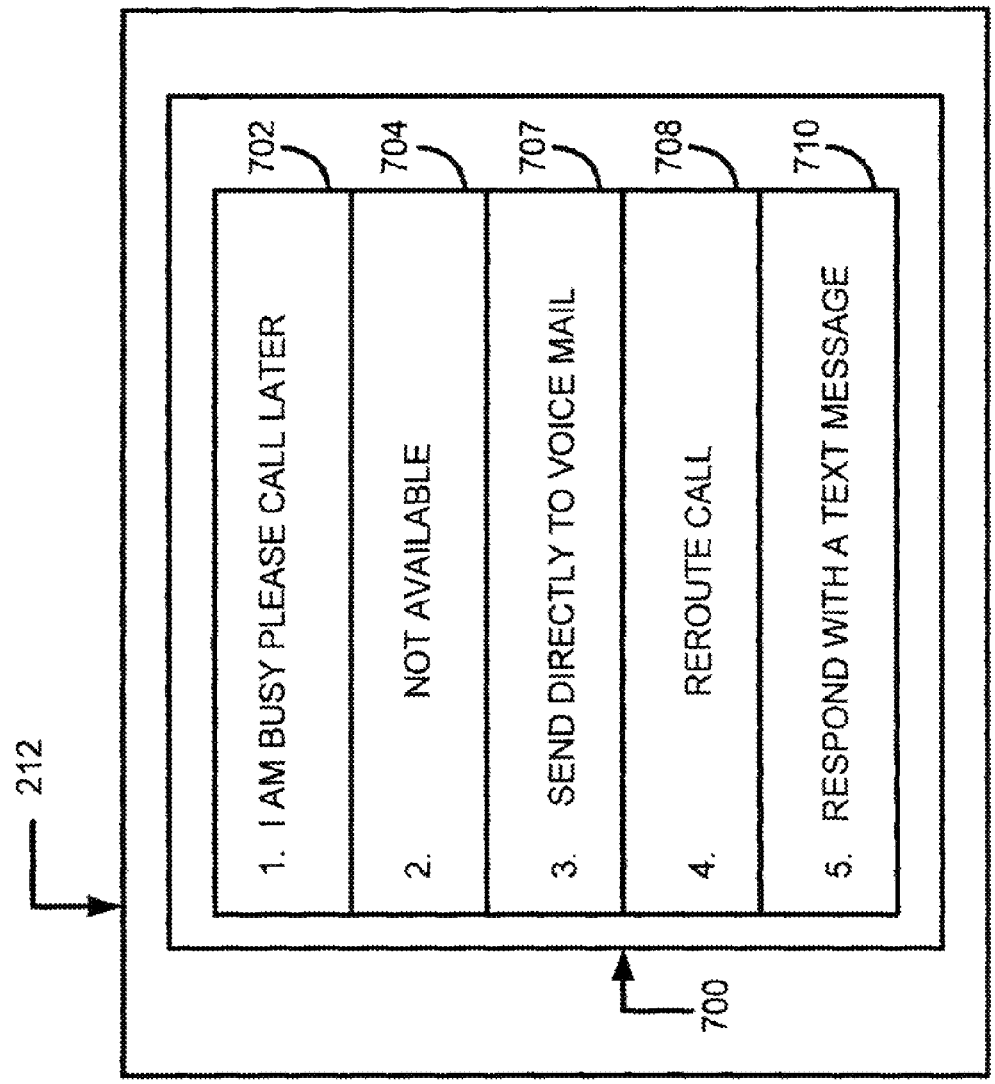
FIG. 7 displays a graphical user interface implemented in accordance with the teachings of the present invention.

FIG. 7 displays one embodiment of a user interface that may appear on the client 212 of FIG. 2. The client 212 may include a variety of devices with mixed media types. For example, the client 212 may be a computer, a PDA, or some other type of visual display device. The client display may include a pop-up list. The pop-up list 600 may include a number of options that can be selected by the called party.

In one embodiment of the present invention, some options provided in the pop-up list 700 facilitate the exchange of messages between the calling party and the called party. Other options in the pop-up list may provide call control functionality. For example, the pop-up list may include a first option 702, which directs the calling party to call later. The pop-up list 700 may include a second option 704, which states that the called party is not available. The pop-up list 700 may include a third option 606, which sends the calling party to voice mail. The pop-up list 700 may include a fourth option 708 that reroutes the calling party to another client. The pop-up list 700 may include a fifth option 710, which responds to the calling party with a text message. It should be appreciated that a variety of options may be implemented in the user interface. For example, options may be provided which direct the calling party to leave a voice mail. An option may be provided to respond with a message and reroute a call, such as "will call later, but please leave a voice mail." Options may be provided to add a caller to a callback list, etc.

In addition, in another embodiment of the present invention, the client 212 may be a voice device with text-to-speech and voice recognition capability. As such, the options may be annunciated to the called party and the called party may verbally select an option.

When the called party selects one of the options, messages are sent back to the server and the server performs a configured response. For example, the server may transmit a pre-canned message back to the calling party or transfer the calling party to a different client machine. Selecting one of the options establishes which configured operations the server will perform. As a result, selecting one of the options provisions the server to perform the configured responses.

Figure 8:
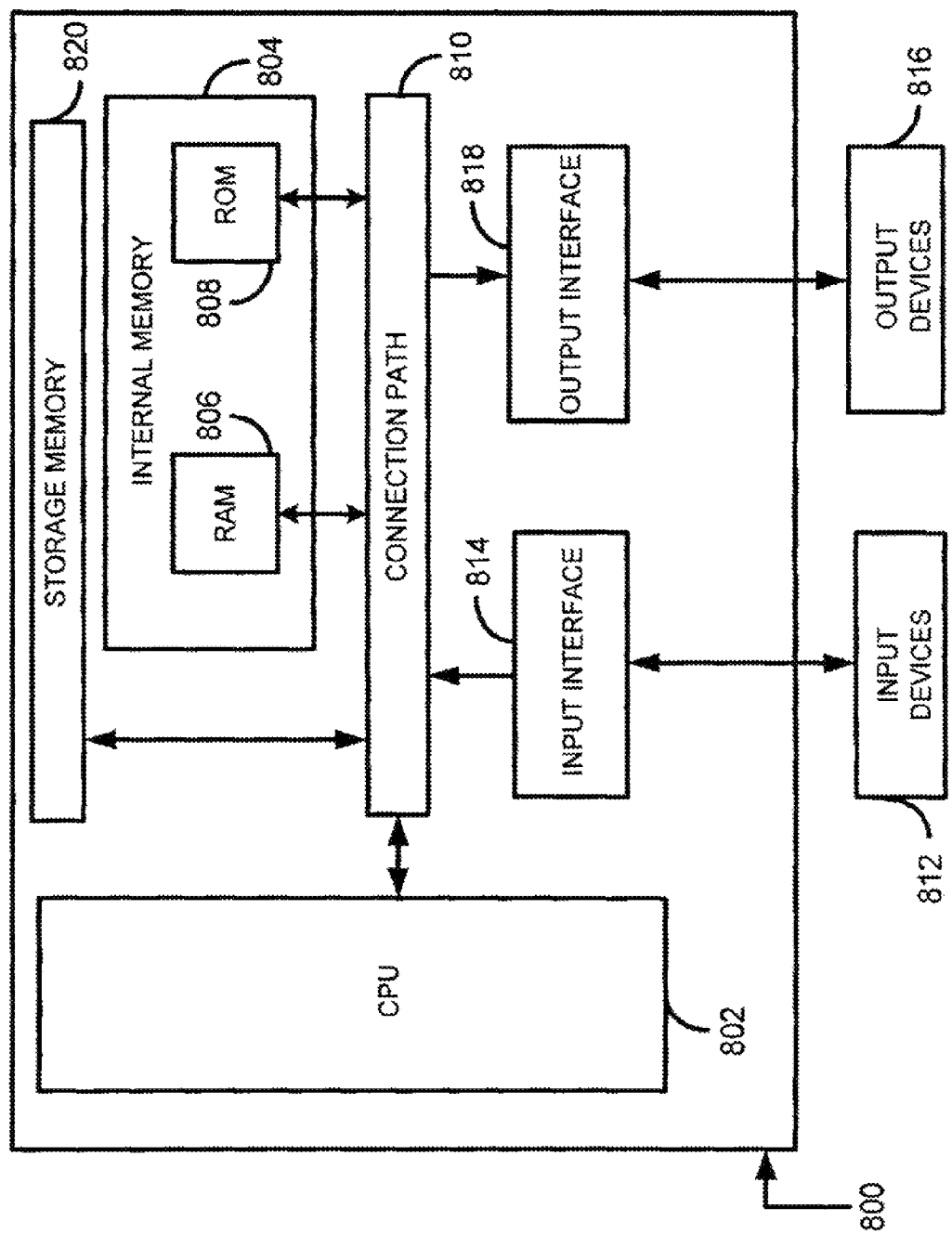
FIG. 8 displays a block diagram of a computer implementing the teachings of the present invention.

FIG. 8 is a block diagram of a computer 800 implementing the components of the present invention. For example, the calling device 202, the VRU 206, the network 204, the server 208, the client connection 210, and the client 212 of FIG. 2 may be implemented with the computer 800. In addition, the computer 800 models many of the different media used in the present invention, such as PDA or cellular telephone.

In FIG. 8, a central processing unit (CPU) 802 functions as the brain of the computer 800. Internal memory 804 is shown. The internal memory 804 includes short-term memory 806 and long-term memory 808. The short-term memory 806 may be Random Access Memory (RAM) or a memory cache used for staging information. The long-term memory 808 may be a Read Only Memory (ROM) or an alternative form of memory used for storing information. A storage memory 820 such as a disk is shown. A connection path 810, such as a bus system, is used by the CPU 802 to control the access and retrieval of information from short-term memory 806, long-term memory 808 and storage memory 820. In addition, the connection path 810 may be connected to interfaces, which communicate information out of the computer 800 or receive information into the computer 800.

Input devices, such as tactile input device, joystick, keyboards, microphone, communications connections, or a mouse, are shown as 812. The input devices 812 interface with the system through an input interface 814. Output devices, such as a monitor, speakers, communications connections, etc., are shown as 816. The output devices 816 communicate with the computer 800 through an output interface 818.

FIG. 9 displays a flow chart of a method implemented in accordance with the teaching of the present invention. FIG. 9 will be discussed in conjunction with FIG. 2. At step 900 a server receives called party identification information. For example, using FIG. 2 the server 208 receives called party identification information that has been communicated across the network 204 from a calling device 202. In one embodiment, an end-user operates the calling device 202 by dialing a called number to reach a called party such as a department store using a called number. It should be appreciated that the calling device 202 may include any communication device and may communicate voice calls or may communicate data such as email. For example, the calling device 202 may include a PDA communicating with instant messaging or the calling device 202 may include a laptop connected to the network 204 where the end user may operate the laptop to participate in a chat session with an agent, etc.

At step 902 the network such as network 204 routes the information to server 208. At step 904 the server 208 receives the called party identification information. At step 906, the server checks to determine if an agent is available. Checking for agent availability may include searching presence information using database 209 to identify a location of an agent. In the alternative, checking for agent availability may include notifying or contacting an agent on client 212 to determine the agent availability. At step 908 the server 208 searches a database such as customer database 207 and/or database 209 using the called party identification information as a key for the search. For example, the called party identification information may include the called number.

The server 208 may then use the called number (i.e., called party identification information) as a key to search the customer database 207 and/or database 209. As a result, the server 208 may search and find information associated with the called party. The information associated with a called party may include information such as the name of a party associated with the called number, catalogue information associated with a called party, street address information associated with a called party, inventory information, sales information, cost information, etc. associated with the called party. In one embodiment, the information associated with the called number may include a script that directs an agent on how to respond to the call received from the end user. For example, the script may instruct an agent on exactly what phrases to use to answer the call to assume the identity or persona of the called party associated with the called party identification information.

After the server 208 searches the customer database 207 and/or database 209 for information associated with the called party, the server 208 may then forward the information associated with the called party to an agent as stated at 910. Forwarding the information associated with the called party to an agent may include communicating the information associated with the called party across a client connection 210 to the client 212. At step 912 the information associated with the called party is forwarded to the client 212 and then the agent operates the client 212 and uses the information associated with the called party to assume the identity and/or persona of the called party.

In one embodiment, the client 212 may be implemented with a computer and receive and display a catalogue (i.e., information associated with the called party). In another embodiment, the client 212 may receive both the information associated with the called party and the call. Lastly, the client 212 may receive the information associated with the called party and the call may be provided to the agent on a separate device. The agent may then operate the client 212, access the information associated with the called party and then assume the persona or identity of the called party. It should be appreciated that the agent may operate the client and assume the persona or identity of the called party using various means such as e-mail, voicemail, using a chat session, an instant message, etc.

In addition to the foregoing methods, additional methods for implementing a call center function are presented. In a first method, when call information is received from a calling party, a configured response, such as an automated response to the calling party, is performed. In a second method, when call information is received from the calling party, a configured response is performed and a notification message (i.e., including information associated with the called party) is transmitted to the agent. In a third method, when call information is received from the calling party, a first configured response, such as a pre-canned message, is transmitted back to the calling party, notification is transmitted to the agent, and a second configured response is performed when a response (Le., agent input) to the notification is received.

FIGS. 3A, 3B, and 3C display flow charts depicting implementations of the foregoing methods. FIGS. 3A, 3B, and 3C will be discussed in conjunction with FIG. 2. In FIG. 3A, call information is initiated at 300. The call information may be initiated with calling device 202. As shown at 302, the call information is communicated across the network 204 to the server 208. At 304, the server performs a configured response, such as transmitting a pre-canned message, which provides the calling party with the name of the agent that will assist him/her and the amount of time before he/she will receive assistance. At 306, the calling device receives call information, which is a response from the server 208.

FIG. 3B displays an implementation of a second method. In FIG. 3B, the calling device 202 initiates a call and generates call information as shown at 308. The call information is communicated across the network 204 to the server 208. The call information may be communicated through VRU 206 if text-to-speech or speech-to-text conversion is required. At 310, the server receives call information from the calling party and responds to the call information with a configured response as stated at 312. The configured response may include a variety of actions, such as communicating a precanned message to the calling party. For example, the pre-canned message may include the statement, "the called party is busy," "please wait while we locate the called party," etc. In the case where a pre-canned message is automatically communicated to the calling party, the calling device receives the pre-canned message from the server 208 via the VRU if conversion is necessary. As such, the calling party may receive a response before the agent is located or before the agent receives the call.

Further, in the second method, the server also sends notification (i.e., a message) to the client 112, as shown at 214, to contact the agent. This message locates the agent via the client 112 and notifies the agent that a call has been received from a calling party. For example, in one embodiment of the present invention, at step 312, the server 108 may respond to the calling party with a pre-canned message (i.e., configured response) stating that "the called party will be with you shortly." In addition, the server may transmit a notification message, as shown at 314, to notify the called party of the call. In another embodiment, the server 208 may first search the database 209 with the call information as search criteria. Once the server 208 receives information associated with the called party including messages carried by the called party identification information, the server 208 may then forward the notification message to the client 212 with the information associated with the called party. An agent may then access the information associated with the called party by operating the client 212 and then assume the persona or identity of the called party when the call is forwarded (i.e., either through the client or using another apparatus) to the agent.

As mentioned previously, it should be appreciated that in one embodiment of the present invention, the database 209 includes presence information, which includes the contact information on various clients 212 that are used by agents. As a result, the server 208 may communicate across the client connection 210 and contact the appropriate agent based on when the agent is on duty and operating the client 212. For example, the presence information may be stored in a relational database, which correlates time with a specific client 212. For example, from 7:00 a.m. to 6:00 p.m., the server may contact a first client 212 because between 7:00 a.m. and 6:00 p.m. an agent is on duty and using the first client. From 7:00 p.m. to 6:00 a.m. the server may communicate with a second client 212, which is different from the first client because during this second time frame the agent on duty is operating a second client. As such, using the presence information, the server 208 is used to locate an agent on the client 212 that the agent is using at the time. In an alternative embodiment, the presence information may be stored as a list of clients 212 and the server 208 may sequentially try each client 212 located in the list until an agent is located.

In a third method, shown in FIG. 3C, the calling party receives an initially configured response from the server 208 and then receives a second configured response from the server 208. Using FIG. 3C, a call is initiated as shown at step 316. At step 318, call information is communicated across the network 204 to the server 208. When the call information is received at the server 208, the server 208 responds to the calling device 202 with a configured response, such as communication of a pre-canned message (i.e., step 320).

In addition, the server 208 at step 322 locates and contacts the client 212. The server 208 sends a notification message to the client 212, which causes a client method to be launched on the client 212. In one embodiment, the notification message includes information associated with the called party. The client method displays a listing of selectable options (i.e., pop-up list, pull-down list, etc.) for the agent to respond to the calling party. The agent selects one of the options in the list, which results in a response to the server 208 as shown at 324. The client 212 responds to the server 208 with an input from the agent, which causes the server 208 to respond to the calling device 202 with a second configured response. For example, the server 208 may respond with a second pre-canned message. The calling device 202 then receives the second pre-canned message from the server 208 as shown at 326. As a result, in this third method of the present invention, a first pre-canned message (i.e., configured response) is generated to the calling party before the agent is contacted and then a second pre-canned message (i.e., configured response) is generated to the calling party after the agent is contacted and responds. As such, the response time to the calling party is reduced because in one embodiment of the present invention, the calling party may receive a quick response before the agent is contacted and then a second response quickly after the agent is contacted.

In addition, the agent may operate the listing of selectable options or another GUI, to assume the persona and/or identity of the called party and communicate with the calling party. For example, assume that the calling party is communicating using electronic mail, instant messaging, or chat room communications. The server may receive the electronic mail, instant messaging, or chat room communications and perform a search based on the called party identification (i.e., destination address, e-mail address, etc.). Using the called party identification information the server may retrieve information associated with the called party and send the information associated with the called party to a client. When the client receives the information associated with the called party, the client may launch a GUI. The agent may then operate the GUI and use the GUI in conjunction with the information associated with the called party to assume the persona and/or identity of the called party and respond to the electronic mail, instant messaging, and/or chat room communication.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method by a called party client for conducting a call, comprising:
   transmitting, by the called party client to a call center server, presence information, the presence information identifying a third party that is available to handle a call from a calling party to a called party, the third party being associated with the called party client, the presence information further comprising information relating time of day to availability of the third party, and identification information of the called party client;
   receiving, by the called party client from the call center server, customer relationship management information associated with the called party and the calling party, the customer relationship management information having been retrieved from a database using a called party number as a search key, the customer relationship management information including product preferences of the calling party, inventory and sales information associated with the called party, catalog information associated with the called party, specific scripts about the called party's business that instruct the third party on what phrases to use to assume a persona of the called party, a responding third party preference of the calling party, and product and price preference associated with the calling party, the customer relationship management information having been sent from the call center server to the called party client based on use of the presence information to select a third party from a plurality of third parties that is available to handle the call from a calling party to a called party, and in accordance with the responding third party preference of the calling party;
   wherein the customer relationship management information further includes business logic identifying a premium call center for use in calls from the calling party, the premium call center comprising a shorter queue and a plurality of third parties specifically trained to assist the calling party;
   in response to receiving the customer relationship management information associated with the called party and the calling party, transmitting, by the called party client, a response to the call center server, the response indicating a precanned message to be sent to the calling party and being in accordance with the responding third party preference of the calling party; and
   conducting a call between the third party and the calling party, wherein the third party assumes the persona of the called party by representing to the calling party that the third party is the called party.

2. A method as set forth in claim 1, wherein the response from the called party client is generated by the third party selecting an item from a list of options in a graphical user interface.

3. A method as set forth in claim 1, further comprising:
   making initial contact with the called party client to notify the third party of the call.

4. A method as set forth in claim 3, wherein the initial contact is further to verify that the third party is available to receive the call.

5. A method as set forth in claim 4, wherein the operations further comprise:
   determining via the initial contact with the called party client that the third party is unavailable to receive the call; and
   identifying an alternate third party to replace the third party.

6. A method as set forth in claim 1, wherein the customer relationship management information further includes a name of a party associated with the called party and street address information associated with the called party.

7. A computer-readable storage device having stored thereon computer readable instructions for conducting a call by a called party client, wherein execution of the computer readable instructions by a processor causes the processor to perform operations comprising:
   transmitting, to a call center server, presence information, the presence information identifying a third party that is available to handle a call from a calling party to a called party, the third party being associated with the called party client, the presence information further comprising information relating time of day to availability of the third party, and identification information of the called party client;
   receiving, from the call center server, customer relationship management information associated with the called party and the calling party, the customer relationship management information having been retrieved from a database using a called party number as a search key, the customer relationship management information including product preferences of the calling party, inventory and sales information associated with the called party, catalog information associated with the called party, specific scripts about the called party's business that instruct the third party on what phrases to use to assume a persona of the called party, a responding third party preference of the calling party, and product and price preference associated with the calling party, the customer relationship management information having been sent from the call center server to the called party client based on use of the presence information to select a third party from a plurality of third parties that is available to handle the call from a calling party to a called party, and in accordance with the responding third party preference of the calling party;

wherein the customer relationship management information further includes business logic identifying a premium call center for use in calls from the calling party, the premium call center comprising a shorter queue and a plurality of third parties specifically trained to assist the calling party;

in response to receiving the customer relationship management information associated with the called party and the calling party, transmitting a response to the call center server, the response indicating a precanned message to be sent to the calling party and being in accordance with the responding third party preference of the calling party; and conducting a call between the third party and the calling party, wherein the third party assumes the persona of the called party by representing to the calling party that the third party is the called party.

8. A computer-readable storage device as set forth in claim 7, wherein the response from the called party client is generated by the third party selecting an item from a list of options in a graphical user interface.

9. A computer-readable storage device as set forth in claim 7, the operations further comprising:
making initial contact with the called party client to notify the third party of the call.

10. A computer-readable storage device as set forth in claim 9, wherein the initial contact is further to verify that the third party is available to receive the call.

11. A computer-readable storage device as set forth in claim 10, the operations further comprising:
determining via the initial contact with the called party client that the third party is unavailable to receive the call; and
identifying an alternate third party to replace the third party.

12. A computer-readable storage device as set forth in claim 7, wherein the customer relationship management information further includes a name of a party associated with the called party and street address information associated with the called party.

13. A called party client device comprising:
a processor;
a network connection; and
a computer-readable storage device having stored thereon computer readable instructions for conducting a call, wherein execution of the computer readable instructions by a processor causes the processor to perform operations comprising:
transmitting, via the network connection to a call center server, presence information, the presence information identifying a third party that is available to handle a call from a calling party to a called party, the third party being associated with the called party client, the presence information further comprising information relating time of day to availability of the third party, and identification information of the called party client;

receiving, via the network connection from the call center server, customer relationship management information associated with the called party and the calling party, the customer relationship management information having been retrieved from a database using a called party number as a search key, the customer relationship management information including product preferences of the calling party, inventory and sales information associated with the called party, catalog information associated with the called party, specific scripts about the called party's business that instruct the third party on what phrases to use to assume a persona of the called party, a responding third party preference of the calling party, and product and price preference associated with the calling party, the customer relationship management information having been sent from the call center server to the called party client based on use of the presence information to select a third party from a plurality of third parties that is available to handle the call from a calling party to a called party, and in accordance with the responding third party preference of the calling party;

wherein the customer relationship management information further includes business logic identifying a premium call center for use in calls from the calling party, the premium call center comprising a shorter queue and a plurality of third parties specifically trained to assist the calling party;

in response to receiving the customer relationship management information associated with the called party and the calling party, transmitting via the network connection a response to the call center server, the response indicating a precanned message to be sent to the calling party and being in accordance with the responding third party preference of the calling party; and conducting a call between the third party and the calling party, wherein the third party assumes the persona of the called party by representing to the calling party that the third party is the called party.

14. A called party client device as set forth in claim 13, wherein the response from the called party client is generated by the third party selecting an item from a list of options in a graphical user interface.

15. A called party client device as set forth in claim 13, the operations further comprising:
making initial contact with the called party client to notify the third party of the call.

16. A called party client device as set forth in claim 15, wherein the initial contact is further to verify that the third party is available to receive the call.

17. A called party client device as set forth in claim 16, the operations further comprising:
determining via the initial contact with the called party client that the third party is unavailable to receive the call; and
identifying an alternate third party to replace the third party.

* * * * *